US007546597B2

(12) United States Patent
Suzuki

(10) Patent No.: US 7,546,597 B2
(45) Date of Patent: Jun. 9, 2009

(54) DATA PROCESSING APPARATUS HAVING FUNCTION OF INSTALLING DEVICE DRIVERS

(75) Inventor: Tomohiro Suzuki, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 784 days.

(21) Appl. No.: 10/448,231

(22) Filed: May 30, 2003

(65) Prior Publication Data

US 2003/0225933 A1 Dec. 4, 2003

(30) Foreign Application Priority Data

May 31, 2002 (JP) ............................. 2002-160145

(51) Int. Cl.
G06F 9/445 (2006.01)
G06F 3/048 (2006.01)
G06F 9/44 (2006.01)

(52) U.S. Cl. .................. 717/175; 717/176; 717/178; 715/772; 719/327

(58) Field of Classification Search ................ 717/121, 717/173, 174
See application file for complete search history.

(56) References Cited

U.S. PATENT DOCUMENTS

| 5,742,286 | A | * | 4/1998 | Kung et al. ............... 715/839 |
| 5,870,610 | A | * | 2/1999 | Beyda ..................... 717/173 |
| 6,023,585 | A | * | 2/2000 | Perlman et al. ........... 717/178 |
| 6,792,610 | B2 | * | 9/2004 | Cheon ..................... 719/327 |
| 6,826,581 | B2 | * | 11/2004 | Moslander et al. ......... 707/203 |
| 6,927,770 | B2 | * | 8/2005 | Ording .................... 345/440 |
| 6,959,437 | B2 | * | 10/2005 | Schacht et al. ............ 719/321 |

FOREIGN PATENT DOCUMENTS

| JP | A 9-116819 | 5/1997 |
| JP | A 10-111849 | 4/1998 |
| JP | A 10-181158 | 7/1998 |
| JP | A 11-232204 | 8/1999 |
| JP | A 2000-242472 | 9/2000 |
| JP | A 2001-109617 | 4/2001 |

(Continued)

OTHER PUBLICATIONS

The Official America Online for Windows 3.1 Tour Guide: Everything You Need to Begin Enjoying the Nation's most Exciting Online Service. Tom Lichty. 3rd Edition—1996.*

(Continued)

Primary Examiner—Tuan Q Dam
Assistant Examiner—Thuy Dao
(74) Attorney, Agent, or Firm—Oliff & Berridge, PLC

(57) ABSTRACT

A data processing apparatus has an interface to which a peripheral composed of a plurality of devices is connected. The data processing apparatus operates on an operating system, which detects the plurality of devices included in the peripheral and installs device drivers corresponding to the plurality of devices. An external process is executed to receive, from the operating system, the number of the devices and the number of device drivers having been installed in the operating system. Then, the external process indicates the progression of the installation of all the device drivers in accordance with the number of the devices and the number of device drives having been installed in the operating system.

30 Claims, 12 Drawing Sheets

FOREIGN PATENT DOCUMENTS

| | | |
|---|---|---|
| JP | A 2001-216246 | 8/2001 |
| JP | A 2001-222502 | 8/2001 |
| JP | A 2001-312453 | 11/2001 |

OTHER PUBLICATIONS

Windows XP Clean Install (Interactive Setup). Paul Thurrott. Dec. 27, 2001.*

The Official America Online for Windows 3.1 Tour Guide: Everything You Need to Begin Enjoying the Nation's most Exciting Online Service. Tom Lichty. 3rd Edition—1996, pp. 181-208.*

"Object REXX for Windows News", May 1999, C. Michel, pp. 1-24. Online retrieved at <http://www.rexxla.org/events/1999/cm2.pdf>.*

"Progress Indicators", Nov. 2002, Apple Inc, pp. 1-14. Online retrieved at <http://developer.apple.com/DOCUMENTATION/Cocoa/Conceptual/ProgIndic/ProgIndic.pdf>.*

* cited by examiner

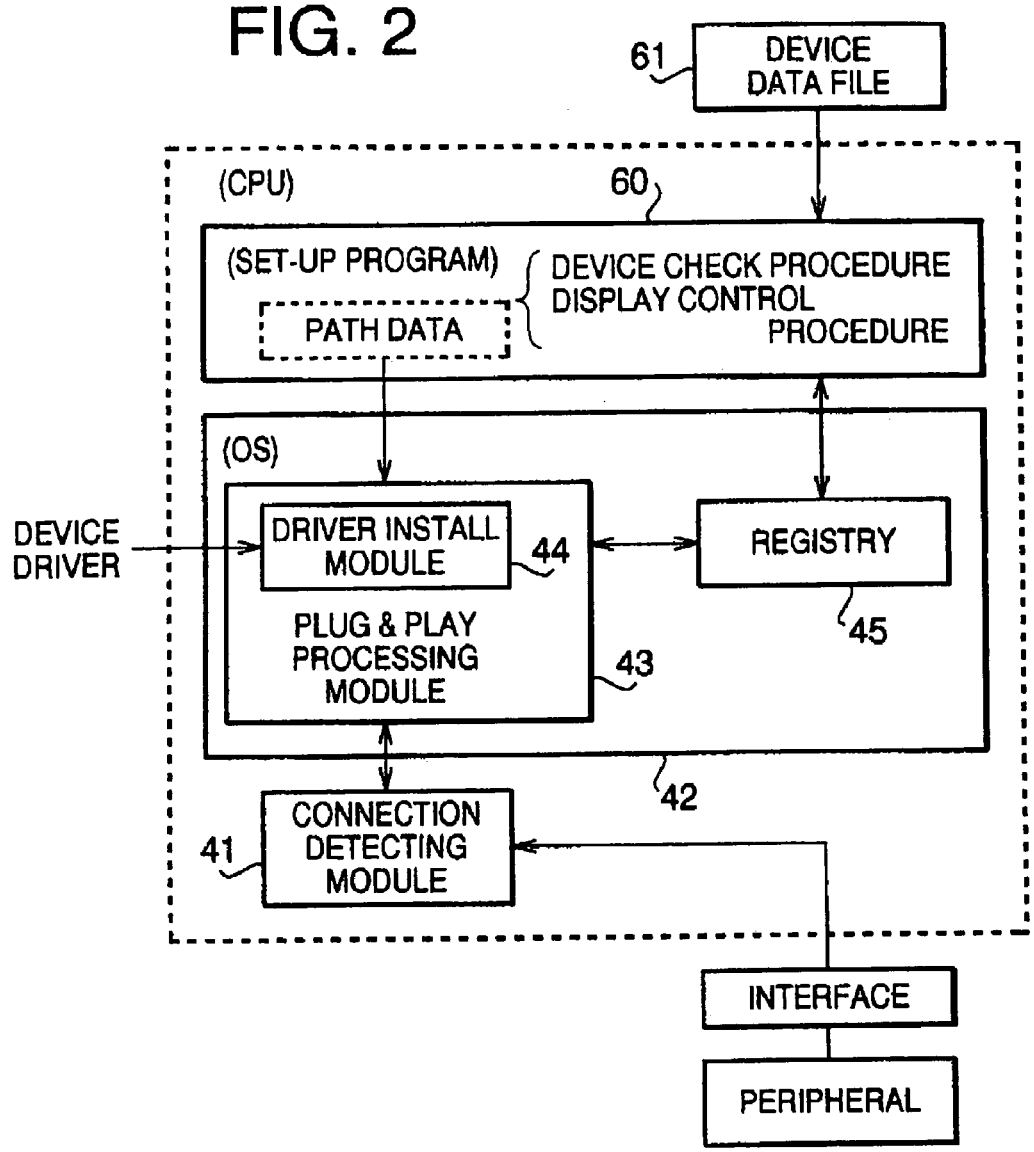

(DEVICE DATA FILE 61)

|   | DEVICE NAME | HARDWARE ID |
|---|---|---|
| 1 | DEVICE 1 | * * * * |
| 2 | DEVICE 2 | * * * * |
| 3 | DEVICE 3 | * * * * |
| . | . | . |
| . | . | . |
| . | . | . |

FIG.11

(DEVICE DATA FILE 61')

|   | DEVICE NAME | HARDWARE ID | CLASS |
|---|---|---|---|
| 1 | DEVICE 1 | * * * * | SCANNER |
| 2 | DEVICE 2 | * * * * | PRINTER |
| 3 | DEVICE 3 | * * * * | MULTI-FUNCTION |
| 4 | DEVICE 4 | * * * * | MODEM |
| 5 | DEVICE 5 | * * * * | MODEM |
| 6 | DEVICE 6 | * * * * | MODEM |

FIG.14

| DEVICE NAME | HARDWARE ID | INF FILE NAME |
|---|---|---|
| MFD-8500 | **** | ****.inf |
|  |  | ****.inf |
|  |  | ****.inf |
|  |  | ****.inf |

DATA PROCESSING APPARATUS HAVING FUNCTION OF INSTALLING DEVICE DRIVERS

BACKGROUND OF THE INVENTION

The present invention relates to a data processing apparatus having a function of installing device drivers for peripherals connected thereto.

Conventionally, as a data processing device, personal computers are widespread. The personal computer is generally configured such that peripherals such as a printer and a scanner can be connected. An operating system (hereinafter, occasionally referred to as OS) of the personal computer is configured such that device drivers for controlling devices in the peripherals connected to the personal computer can be installed.

As the OS for the personal computer, Windows system® and UNIX® system are known. Such an OS includes a kernel, which is software performing fundamental functions of the OS, and various software groups necessary for operating the system such as an install program which assists in installing the device drivers.

Recently, as the personal computers become widespread, there is a requirement that the operability of the personal computers is improved for users who do not have expert knowledge about the personal computers. As one solution for this requirement, the OS is typically provided with a plug-and-play function, which automatically detects a device in a peripheral connected to the personal computer. In particular, the Windows OS is configured such as to execute an install program which automatically installs a device driver necessary for controlling a detected device when the OS detects a new device.

The install program is typically configured to display a progression of an installation status of the device driver on a display device of the personal computer, and a user can check the progression for the currently installed device driver.

However, the above-described conventional install program supplied with the OS executes the installation of the device driver one by one, and therefore, even when a plurality of device drivers are to be installed, only the progression for each driver can be checked at a time. When a plurality of device drivers are installed sequentially, it is impossible for the user to know the progression of the entire install operation. The user cannot know when the installation of all the drivers is completed.

For example, if a peripheral including a plurality of devices (e.g., a digital multi-function machine including printer and scanner functions) is connected to a personal computer, the OS detects the devices in the connected peripheral, and installs device drivers for the respective devices, sequentially. In such a case, since the conventional install program does not display the progression of the entire install operation (i.e., installation of all of the plurality of device drivers), the user should wait for the completion of the installation without knowing when the installation of all the drivers is finished. Therefore, in such a system, the user may be irritated because of a relatively long installation time period.

SUMMARY OF THE INVENTION

The present invention is advantageous in that a data processing apparatus capable of displaying the progression of the entire installation operation is provided.

According to an aspect of the invention, there is provided a data processing apparatus which operates on an operating system. The data processing apparatus has an interface to which a peripheral composed of a plurality of devices can be connected. The data processing apparatus is provided with a an installer that installs device drivers corresponding to the plurality of devices by detecting the plurality of devices implemented in the peripheral, obtaining device drivers corresponding to the plurality of devices, and storing device data regarding the plurality of devices in a first device data storage which is also provided to the data processing apparatus.

The data processing apparatus further includes a second device data storage that stores target device data regarding target devices which correspond to the device drivers to be installed in the operating system by the installer, a number recognition system that recognizes the number of the target devices corresponding to the device drivers to be installed in the operating system in accordance with the target device data stored in the second device data storage, a monitoring system that monitors a progression of installation executed by the installer, and a progression indication system that indicates the progression of the installation of all the device drivers executed by the installer in accordance with a monitoring result by the monitoring system and a recognition result of the number recognition system.

With this configuration, the data processing apparatus is capable of displaying the progression of the entire installation operation.

Optionally, the progression indication system may include a display, and the progression of the installation may be displayed on the display.

Further optionally, the progression indication system may indicate the progression of the installation as a ratio of the number of the device drivers having been installed to the number of the target devices at a completion of the installation of each of the device drivers.

Optionally or alternatively, the progression indication system may include a determining system that identifies a class, from among a plurality of predetermined classes, to which each of the devices corresponding to the device drivers installed by the installer belongs in accordance with the monitoring result by the monitoring system and the recognition result of the number recognition system. The determining system may determine whether all the device drivers belonging to each class have been installed. When the progression indication system indicates the progression, the indication may be made on a class basis.

Typically, the progression indication system may display the progression of the installation on the display using a single bar graph.

Optionally, a value of the bar graph indicative of the progression of the installation is increased at every predetermined interval when the installation is in progress. The increasing amounts of the value of the bar graph during the installation and at the completion of the installation may be different so that a user can recognize the installing status.

Optionally, the monitoring system may monitor the progression of the installation of the device drivers by referring to the device data stored in the first device data storage.

Further optionally, the installer may obtain a device driver corresponding to each of the detected devices and store driver data of each device driver in relation to identification data of the device in the first device data storage. Further, the monitoring system may determine whether the installation of the device drivers corresponding to the target devices is finished by monitoring a registration status of the device data in the first device data storage.

Still optionally, the installer may be configured to detect a new device by determining whether the identification data of each device included in the peripheral connected to the interface is stored in the first device data storage, and to install a device driver corresponding to the new device. The data processing apparatus may include an initializing system that determines whether all the device data for the target devices is stored in the first device data storage based on the target device data stored in the second storage, and delete the identification data of the target devices from the first device data storage when the initializing system determines that all the driver data is not stored in the first data storage.

Optionally, the data processing apparatus may further include an assist system that assists the installer in obtaining data necessary for installing the device drivers.

In a particular case, the assist system supplies the installer with location data indicating a location where the device drivers necessary for the installation can be obtained.

According to another aspect of the invention, there is provided a method of displaying a progression of installation for a data processing apparatus having an interface to which a peripheral composed of a plurality of devices is connected. The data processing apparatus operates on an operating system provided with a first device data storage and an installer that installs device drivers corresponding to the plurality of devices by detecting the plurality of devices implemented in the peripheral, obtaining device drivers corresponding to the plurality of devices, and storing device data regarding the plurality of devices in the first device data storage. The method may include the steps of monitoring a progression of installation of device drivers executed by the installer, recognizing the number of target devices of which device drivers are to be installed by the installer based on target device data regarding the target devices corresponding to the device drivers to be installed by the installer, and displaying the progression of the installation of all the device drivers based on the results of the steps of monitoring and recognizing.

Optionally, the step of displaying may display the progression as a ratio of the number of devices corresponding to the device drivers having been installed by the installer to the number of the target devices recognized by the number recognition system at a completion of the installation of each of the device drivers for the target devices.

In a certain case, the step of displaying may display the progression of installation with a bar graph.

Optionally, a value of the bar graph indicative of the progression of installation may be increased at every predetermined interval when the installation is in progress.

According to a further aspect of the invention, there is provided a device driver install system for a data processing apparatus having an interface to which a peripheral composed of a plurality of devices is connected. The device driver install system may be provided with an operating system on which the data processing apparatus operates and an external process. The operating system detects the plurality of devices included in the peripheral as connected and installs therein device drivers respectively corresponding to the plurality of devices. The external process receives, from the operating system, the number of the plurality of devices and the number of device drives having been installed in the operating system. The external process indicates the progression of the installation of all the device drivers in accordance with the number of the plurality of devices and the number of device drivers having been installed in the operating system.

Optionally, the device driver install system may further include a display device, and the external process may indicate the progression of the installation by displaying at least one of a single bar graph and a numerical value on the display device.

Further optionally, the external process may indicate a completion of the installation of each of the device drivers.

Alternatively or optionally, the device drivers may be categorized in a plurality of classes each including at least one device driver. The external process may indicate the completion of the installation of all the device drivers included in each of the plurality of classes.

Further optionally, the external process may indicate that the installation of each of the device drivers is in progress when each of the device drivers is being installed.

Still optionally, the external process may assist the operating system in installing the plurality of device drivers.

In this case, the external process may provide path data of each of the plurality of device drivers.

In a particular case, the external process is supplied as a program to be executed by the data processing apparatus.

Further, the program may be recorded on a recording medium that can be accessed by the data processing apparatus.

The apparatus, system and method according to the present invention can be realized when appropriate programs are provided and executed by a personal computer. Such programs may be stored in recording medium such as a flexible disk, CD-ROM, and memory cards. Alternatively or optionally, such programs can be distributed through networks such as the Internet.

BRIEF DESCRIPTION OF THE ACCOMPANYING DRAWINGS

FIG. 2 is a block diagram showing functions realized by operation of a CPU;

FIG. 3 shows a data structure of a registry;

FIG. 11 shows a data structure of a device data file;

FIG. 14 shows a data structure of a device data file.

DESCRIPTION OF THE EMBODIMENT

Hereinafter, a personal computer (which will be occasionally referred to as PC) 10 according to an embodiment of the invention will be described with reference to the accompanying drawings.

Figure 1:
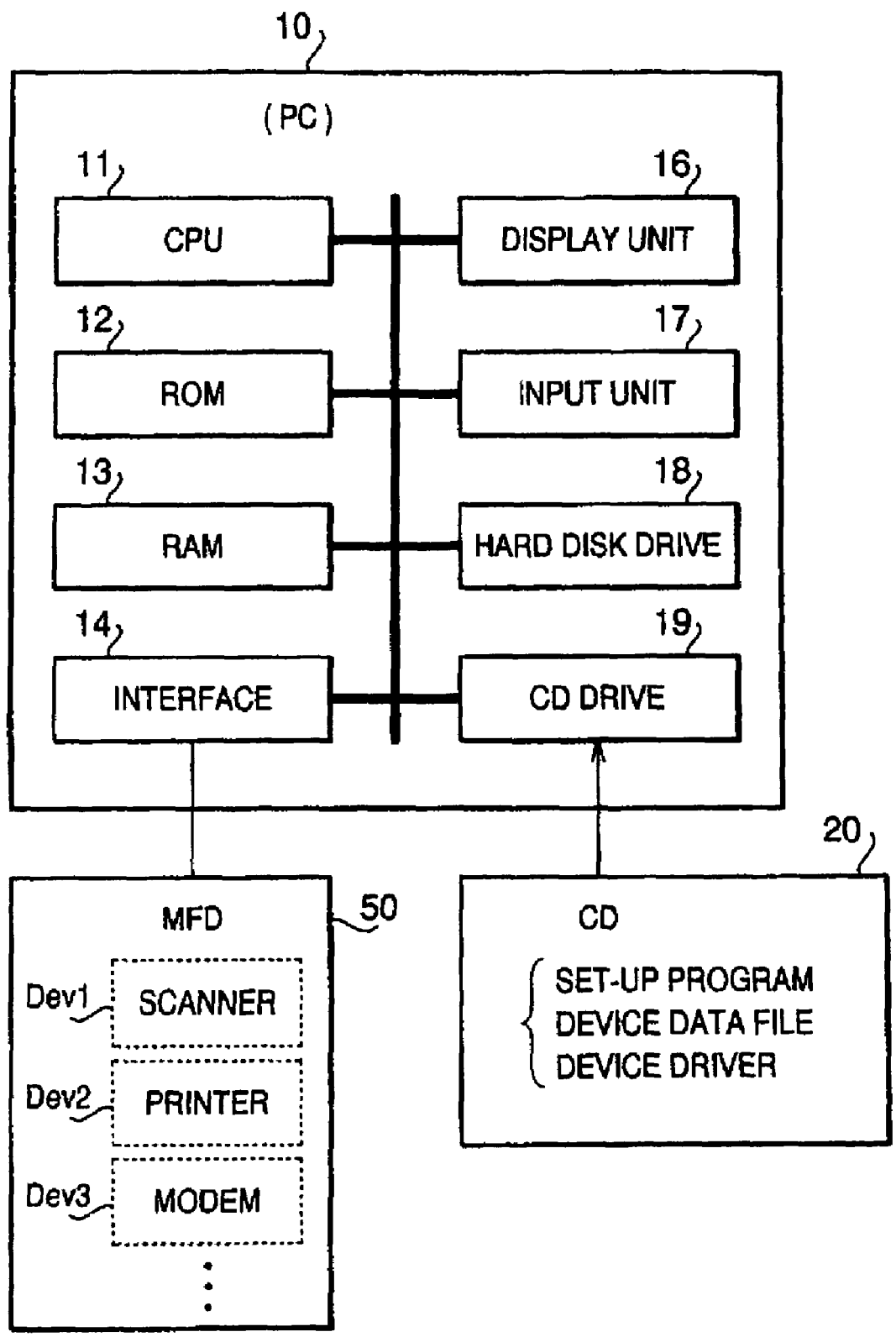
FIG. 1 is a block diagram showing a configuration of a PC according to an embodiment of the invention.

FIG. 1 is a block diagram showing a configuration of the PC 10 according to the embodiment.

The PC 10 includes, similarly to conventional PCs, a CPU 11 for controlling an entire operation of the PC 10, a ROM (Read Only Memory) 12, and a RAM (Random Access Memory) 13. The PC 10 is further provided with an interface 14 for connecting a peripheral including devices to the PC 10, a display unit 16, an input unit 17 (e.g., a keyboard and a mouse) as a user interface, a hard disk drive 18 as a storage device, and a CD drive 19 capable of reading data stored in a compact disc (CD) 20.

Specifically, in the PC 10, as an operating system (OS) 42 (see FIG. 2) for managing operation of the PC 10, a Windows® operating system (Windows XP or later) is installed in the hard disk drive 18. Accordingly, when the PC 10 is powered ON, the Windows® is started and thus the PC 10 operates under control of the OS 42. The interface 14 may be a parallel interface, a USB (Universal Serial Bus) interface or an IEEE1394 interface, to which a peripheral having a plurality of device functions can be connected.

Incidentally, in order to control the devices in the peripheral connected through the Interface 14 on the PC 10 side, device drivers corresponding to the devices should be installed in the OS 42.

As shown in FIG. 2, the PC 10 is configured such that the function of detecting the connected devices (i.e., connection detecting module 41) and the function of the OS 42 are realized on the CPU 11. Specifically, based on the detection results by the connection detecting module 41, a plug-and-play processing module 43 in the OS 42 detects a new device. Then, a driver install module 44 for installing a device driver for the new device in the OS 42 is executed, thereby the device driver is automatically installed by the driver install module 44 without the necessity of a specific operation by the user.

As described above, the OS 42 according to the embodiment includes a program which implements the CPU 11 to function as the plug-and-play processing module 43 as an attachment program. By executing the attachment program, the installation of the device can be executed automatically.

The installation of the device driver will be described in detail. The OS 42 controls the connection detecting module 41 to detect devices in the peripheral connected to the interface 14, and the plug-and-play processing module 43 to determine whether a new device is connected by comparing the detection result of the connection detecting module 41 with the contents of a registry 45 which is managed by the OS 42.

FIG. 3 shows a data structure of the registry 45. As shown in FIG. 3, the registry 45 includes a device table 46 and registry data 47 corresponding to each of the devices listed in the device table 46. The registry 45 is updated by operation of the plug-and-play processing module 43 based on the detection results of the connection detecting module 41.

In the device table 46, a device handle which is ID (identification) data of each device is described for each device, and the registry data 47 is stored in relation to the device handle.

The registry data 47 includes a data value of a parameter "DeviceDesc", a data value of a parameter "Hardware ID", and a data value of a parameter "Driver".

It should be noted herein that, when a device driver is installed as the plug-and-play processing module 43 operates, as registry information with respect to a device of the installed device driver, a data value representing a device name is given to the parameter "DeviceDesc", and the Hardware ID (which is also referred to as PnPID) is given to the parameter "Hardware ID" as the data values described above. To the parameter "Driver", driver ID data for reading the device driver in the OS 42 is given as the data value.

Next, the operation of the plug-and-play processing module 43 will be described with reference to FIG. 4, which shows a flowchart executed by the CPU 11 when the OS 42 functions as the plug-and-play processing module 43.

Figure 4:
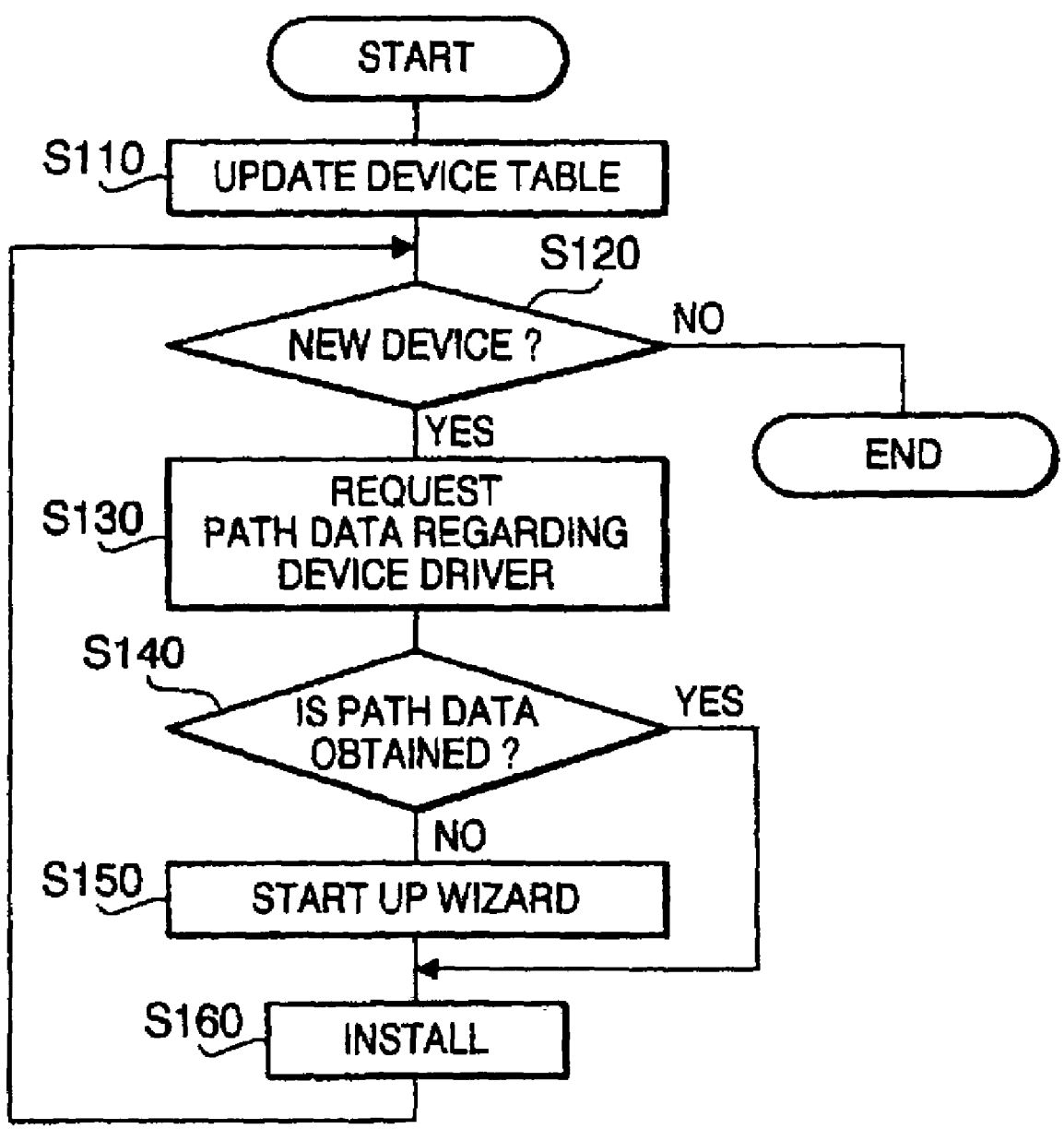
FIG. 4 is a flowchart illustrating a plug-and-play processing.

When an event signal indicating that there is a change in connection status of the devices is transmitted from the connection detecting module 41 to the OS 42, the OS 42 starts the plug-and-play processing shown FIG. 4. When the plug-and-play processing starts, the OS 42 firstly obtains the detection status of the connection detecting module 41 and updates the device table 46 in the registry 45 so that the devices currently connected to the PC 10 through the interface 14 are listed in the device table 46 (S110). When the device handle which has not been listed in the device table 46 is listed after the update, the OS 42 determines that a new device is connected through the interface 14 (S120:YES). That is, when the device handle which was not included in the device table 46 has been added thereto, the OS 42 detects a device, included in the peripheral, corresponding to the newly added device handle as the new device. Then, in S130, the OS 42 requests an external task for path data indicative of a path from which the device driver corresponding to the newly added device is obtained.

When the path data is not transmitted from the external task (S140: NO), the OS 42 starts up an install wizard to ask the user interactively to input the path data (S150). Then, the user operates the input unit 17, from which the OS 42 obtains the path data. After obtaining the path data, the OS 42 executes the driver install module 44 (S160). The OS 42 reads a definition file for installation of the device driver (e.g., an INF file) stored in the area indicated by the path data, obtains the driver data of the device driver described in the definition file, and stores the driver data of the device driver as the registry data in relation to the corresponding device handle, thereby the device driver is installed in the OS 42.

At this stage, in accordance with the driver data described in the definition file, the device name is stored in the parameter "DeviceDesc" as the driver data of the device, and the driver ID data is stored in the parameter "Driver".

When the OS 42 determines in S140 that the path data is obtained from the external task (S140: YES), the OS 42 installs the device driver in S160, and then returns control to S120. When there still is another newly added device which has been added in the updating operation in S110 (S120: YES), the steps S120 through S160 described above are repeated. When the OS 42 determines that newly added device does not exist (S120: NO), the procedure shown in FIG. 4 is finished.

As described above, in the PC 10 according to the present embodiment, the device drivers corresponding to the newly connected devices are installed in the OS 42 with the plug-and-play function. However, it is sometimes difficult for the user to correctly install the device drivers only with the plug-and-play processing module 43 controlled by the OS 42.

For example, when the path data is requested in S130 of FIG. 4, when the path data is not obtained, the OS 42 asks the user interactively to input the path data. However, the user may not be able to input the path data for the device driver correctly corresponding to the device. In such a case, even though the device driver can be formally installed, when the device driver does not match the device, the device cannot be controlled from the PC 10.

Therefore, recently, a set-up program capable of inputting the correct path data of the device driver in response to the request in S130 of FIG. 4 is generally supplied from the manufacturer of the peripheral, together with the driver itself, by means of a CD, flexible disk and/or via the Internet. The set-up program functions to assist the installation of the device drivers.

Hereinafter, a set-up program 60 which installs the device drivers corresponding to the devices included in a digital multi-functional device (hereinafter referred to as MFD) 50 shown in FIG. 1 will be described in detail. The MFD 50 is a peripheral having devices such as an image scanner for capturing image data of an original, a printer for forming an image on a recording sheet in accordance with print data (e.g., PDL data), and a modem for bidirectionally communicating with external network systems.

Figure 5:
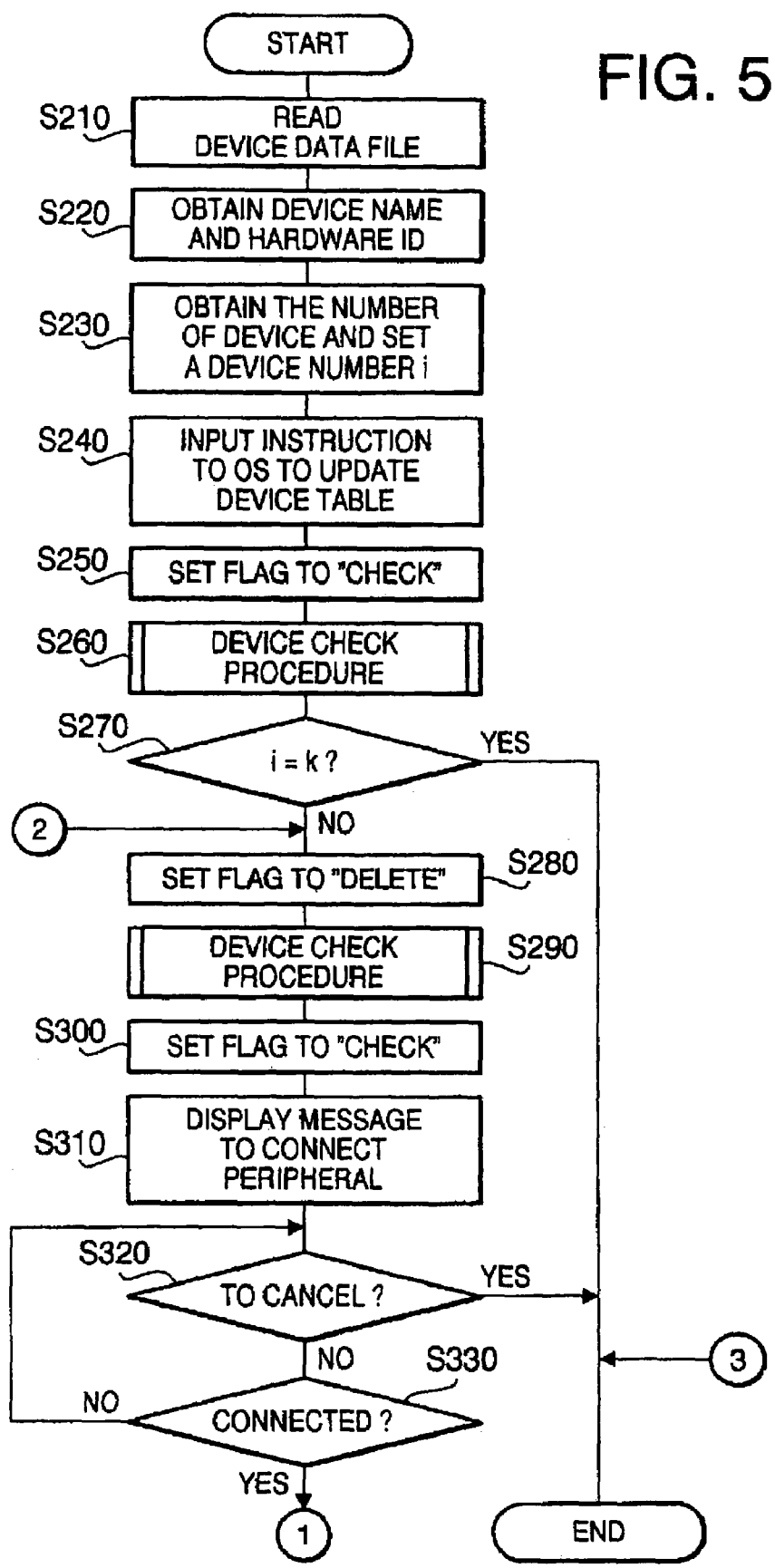
FIGS. 5 and 6 show a flowchart illustrating an installing procedure executed by an set-up program.
Figures 6, 7:
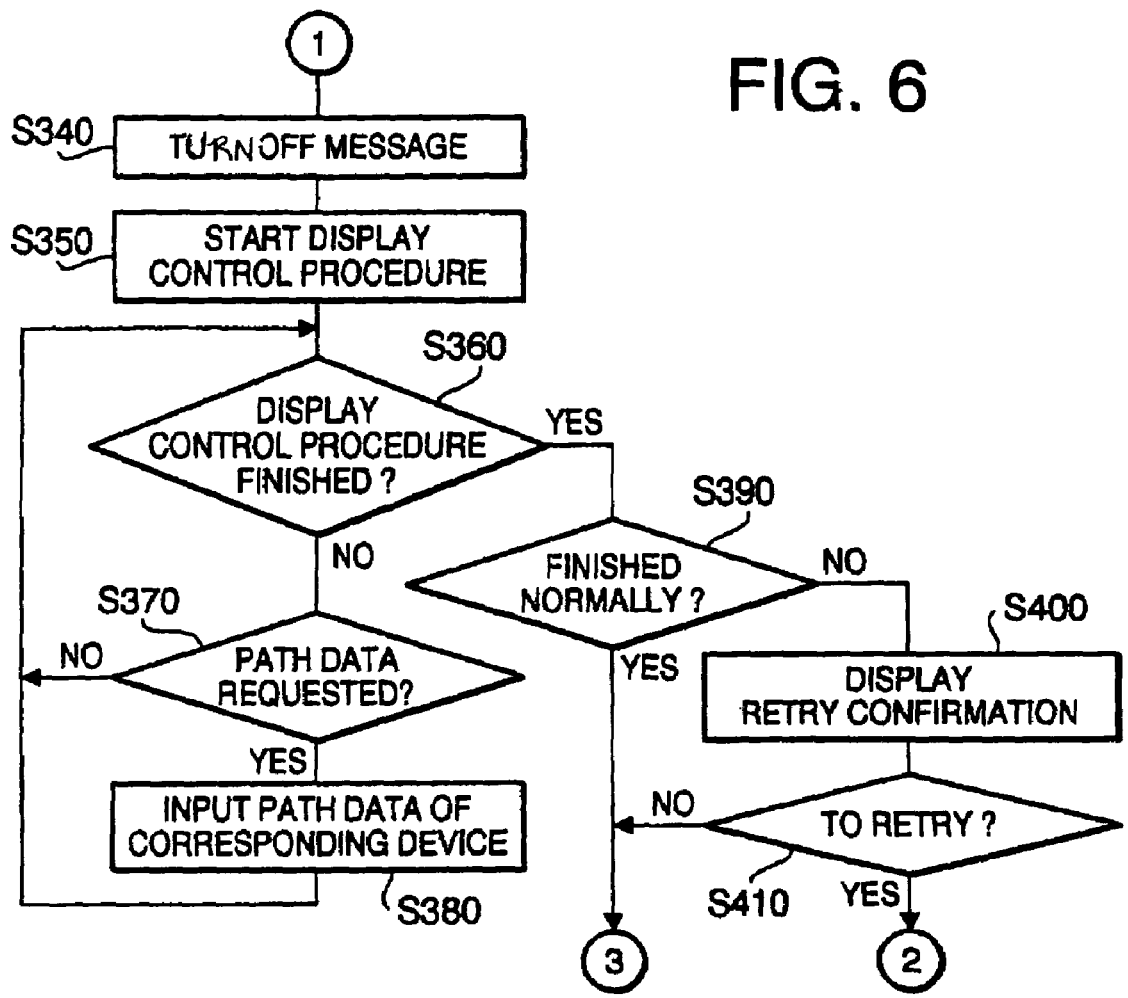
FIG. 7 shows a data structure of a device data file.

FIGS. 5 and 6 show a flowchart illustrating an installing procedure. When the CD 20 storing the set-up program 60 and a device data file 61 is inserted in the CD drive 19, the CPU 11 starts up the set-up program 60 to execute the installing procedure shown in FIGS. 5 and 6.

In S210, the set-up program 60 reads out the device data file 61 stored in the CD 20 via the CD drive 19, obtains device data of target devices of which the device drivers should be installed with the plug-and-play processing module 43, and stores the thus obtained device data in the RAM 13 (S220, S230). As shown in FIG. 7, in the device data file 61, the device names and hardware IDs of the target devices are stored as related data.

Specifically, the set-up program 60 obtains the device names and hardware IDs of all the devices listed in the device data file 61 (S220). Then, in S230, the set-up program 60 obtains the device number data indicative of the number of the target devices listed in the device data file 61. Then, based on the device number data, a value i indicating the number of the target devices is set. In the embodiment, the number of the target devices is directly obtained from the device data file 61, and the value i is set based on the thus obtained number. However, the invention is not limited to this configuration, and for example, the set-up program 60 may count the number of the devices listed in the device data file 61, and the counted value may be set to the value i.

Thereafter, the set-up program 60 transmits an update command instructing updating of the device table 46 to the OS 42 (S240), thereby the OS 42 updates the device table 46. With this updating, the device handles corresponding to the devices currently connected with the PC 10 are listed in the device table 46. Thus, the device table 46 is updated to indicate the latest device connection status.

After S240, the set-up program 60 sets the flag value, which is set to "CHECK" or "DELETE", to "CHECK" in S250, and then executes a device check procedure (S260).

Figure 8:
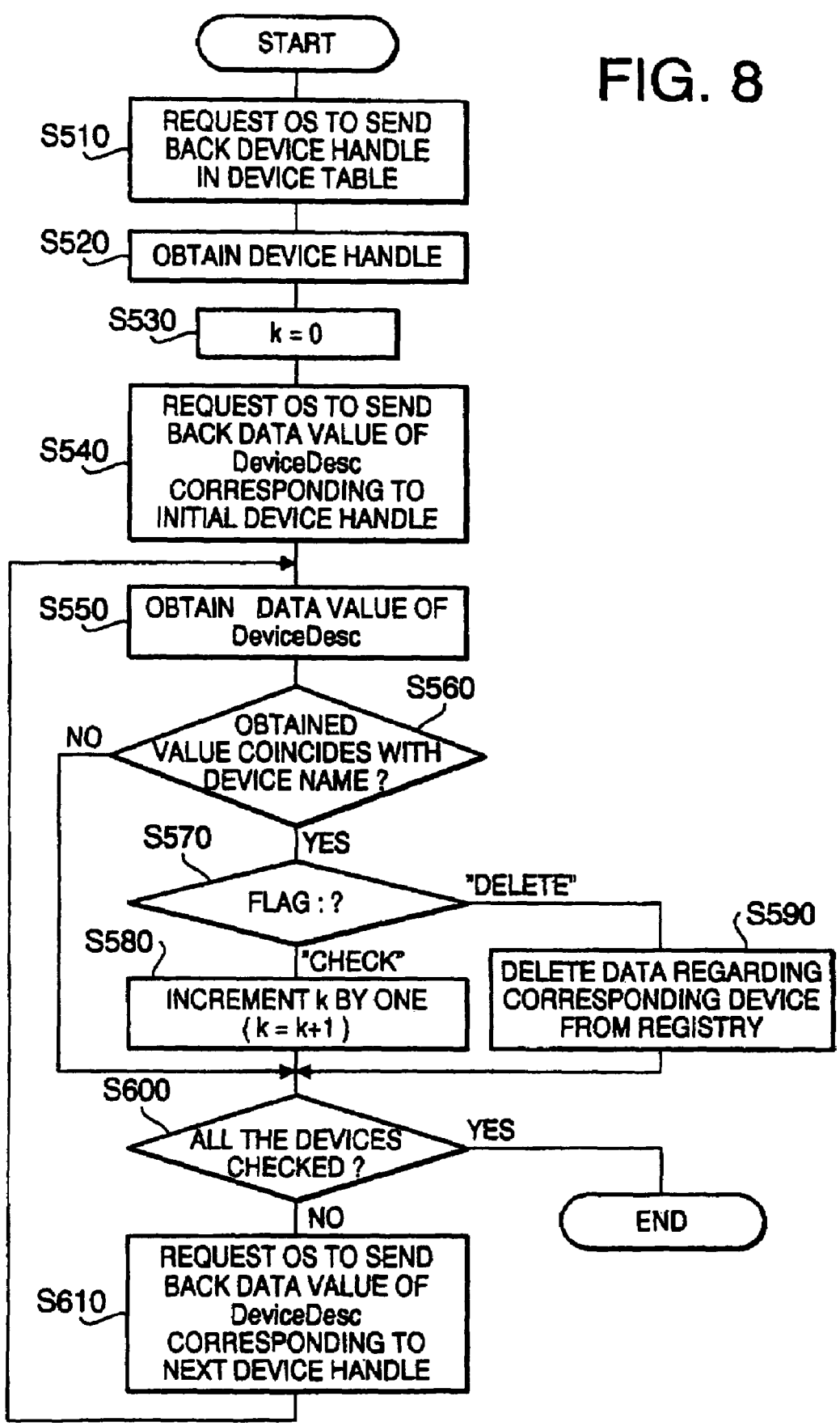
FIG. 8 is a flowchart illustrating a device check procedure executed by the set-up program.

FIG. 8 is a flowchart illustrating the device check procedure, which is called in S260 of FIG. 5.

In S510, the set-up program 60 requests the OS 42 to return the device handles listed in the device table 46. Then, the OS 42 sends all the device handles listed in the device table 46 to the set-up program 60, and accordingly, the set-up program 60 obtains all the device handles returned from the OS 42 in S520.

In S530, the set-up program 60 initializes a value k (k=0) which is used for counting the number of devices of which the device drivers have been installed. In S540, the set-up program 60 requests the OS 42 to return a data value of the parameter DeviceDesc stored in the registry 45 as the registry data 47 corresponding to the first one of the device handles obtained in S520. Then, in S550, the set-up program 60 receives the data value of the parameter DeviceDesc from the OS 42.

Next, the set-up program 60 compares the data value of the parameter DeviceDesc thus obtained in S550 with a device name read out of the device data file 61 (S560). When they do not coincide with each other, control proceeds to S600, where the set-up program 60 determines whether the comparison in S560 has been executed for all the devices listed in the device data file 61. Even if the device name is not identical to the data value of the DeviceDesc, the set-up program 60 determines that the data value of DeviceDesc and the device name coincide when the device name is included in the data value of the DeviceDesc.

In S600, when the set-up program 60 determines that the comparison in S560 has not been executed for all the devices, then control proceeds to S610, where the set-up program 60 selects another device handle which has not been compared from among the device handles obtained in S520, and requests the OS 42 to return the data value of the DeviceDesc of the selected device handle.

Then, S550 is executed again, where the set-up program 60 receives the data value of the parameter DeviceDesc, and determines whether the received data value of the DeviceDesc coincides with any one of the device names obtained from the device data file 61. When the set-up program 60 determines that the data value of the DeviceDesc coincides with the device name (S560: YES), it determines whether the flag is set to "CHECK" or "DELETE" in S570. In the device check procedure called in S260, since the flag has been set to "CHECK" in S250, control proceeds from S570 to S580, where the set-up program 60 increases the value k by one (k=k+1). Then, in S600, the set-up program 60 determines whether the comparison in S560 has been executed for all the devices listed in the device data file 61. When the comparison has been executed for all the devices (S600: YES), the device check procedure is terminated.

In FIG. 5, when the device check procedure is completed in S260, the set-up program 60 determines whether the value i indicative of the number of the target devices listed in the device data file 61 coincides with the value k indicative of the number of the devices whose device drivers have been installed (i.e., i=k), in S270. When i=k (S270: YES), since the device drivers for all the target devices have been installed, the procedure is terminated. If not (i.e., i≠k) (S270: NO), control proceeds to S280.

In S280, the set-up program 60 sets the flag to "DELETE", and then calls the device check procedure again (S290). Then, the device check procedure shown in FIG. 8 is executed. As described above, the set-up program 60 repeats steps S550 through S610. The set-up program 60 obtains the value of the parameter DeviceDesc in S550. Then, when the obtained value of the parameter DeviceDesc coincides with the device name (S560: YES), control proceeds to S570.

It should be noted that, when the device check procedure is called in S290, the flag has been set to "DELETE" (S280). Therefore, at this stage (i.e., in S570), the set-up program 60 determines that the flag is set to "DELETE", and control proceeds to S590, where data regarding the device (i.e., the registry data and device handle) is deleted from the registry 45. Such a procedure is executed with respect to all the devices triggering counting of the value k indicative of the number of target devices whose device drivers have been installed. Then, in S600, the set-up program 60 determines that all the devices have been checked (S600: YES), and the procedure is terminated. With this procedure, all the device drivers related to the MFD 50, which were installed in the OS 42 before the set-up program 60 was started up, are uninstalled.

In FIG. 5, when the device check procedure in S290 is finished, the set-up program 60 sets the flag to "CHECK" (S300), and displays a message requiring that the MFD 50 should be connected to the interface 14 on the screen of the display unit 16 (S310).

In S320, the set-up program 60 determines whether a command for cancelling the installation has been input by a user through the input unit 17. When such a command has not been input (S320: NO), the set-up program 60 determines whether the MFD 50 has been connected to the interface 14 (S330). When the set-up program 60 determines that the MFD 50 has been connected to the interface 14 (S330: YES), control proceeds to S340 (FIG. 6), where the message displayed on the display unit 16 is deleted from the screen, and a display control procedure (shown in FIG. 9), which will be described later, is started (S350). The display control procedure is executed by the set-up program 60 in parallel with the currently executed installing procedure. Further, when the MFD 50 is connected to the interface 14, the OS 42 starts the plug-and-play processing as described above.

After the step S350 is executed, until the display control procedure is terminated, control proceeds from S360 to S370, where the set-up program 60 determines whether the OS 42 requests for the path data. When the OS 42 requests for the path data (S370: YES), the set-up program 60 inputs the path data indicative of the directory of the device driver to be installed by the plug-and-play processing module 43 as the device driver corresponding to the request, in the task (i.e., the plug-and-play processing module 43) from which the request is issued.

When the path data is input, the driver install module 44 is initiated, with respect to the device, in the plug-and-play processing module 43, and the device driver corresponding to the device is installed. The plug-and-play processing module 43 executes the driver install module 44 for each of a plurality of devices DEVICE1, DEVICE2, DEVICE3 ... and DEVICEn (n being the number of devices) in the MFD 50. Accordingly, the installation operations of the device drivers corresponding to the devices DIVICE1, DEVICE2, DEVICE3, ... and DEVICEn in the MFD 50 are executed continuously in accordance with the input of the path data from the set-up program 60.

When the plug-and-play processing module 43 continuously installs the device drivers corresponding to the devices of the MFD 50, the display control procedure which runs parallelly displays the progression of the installation on the screen of the display unit 16.

Figure 9:
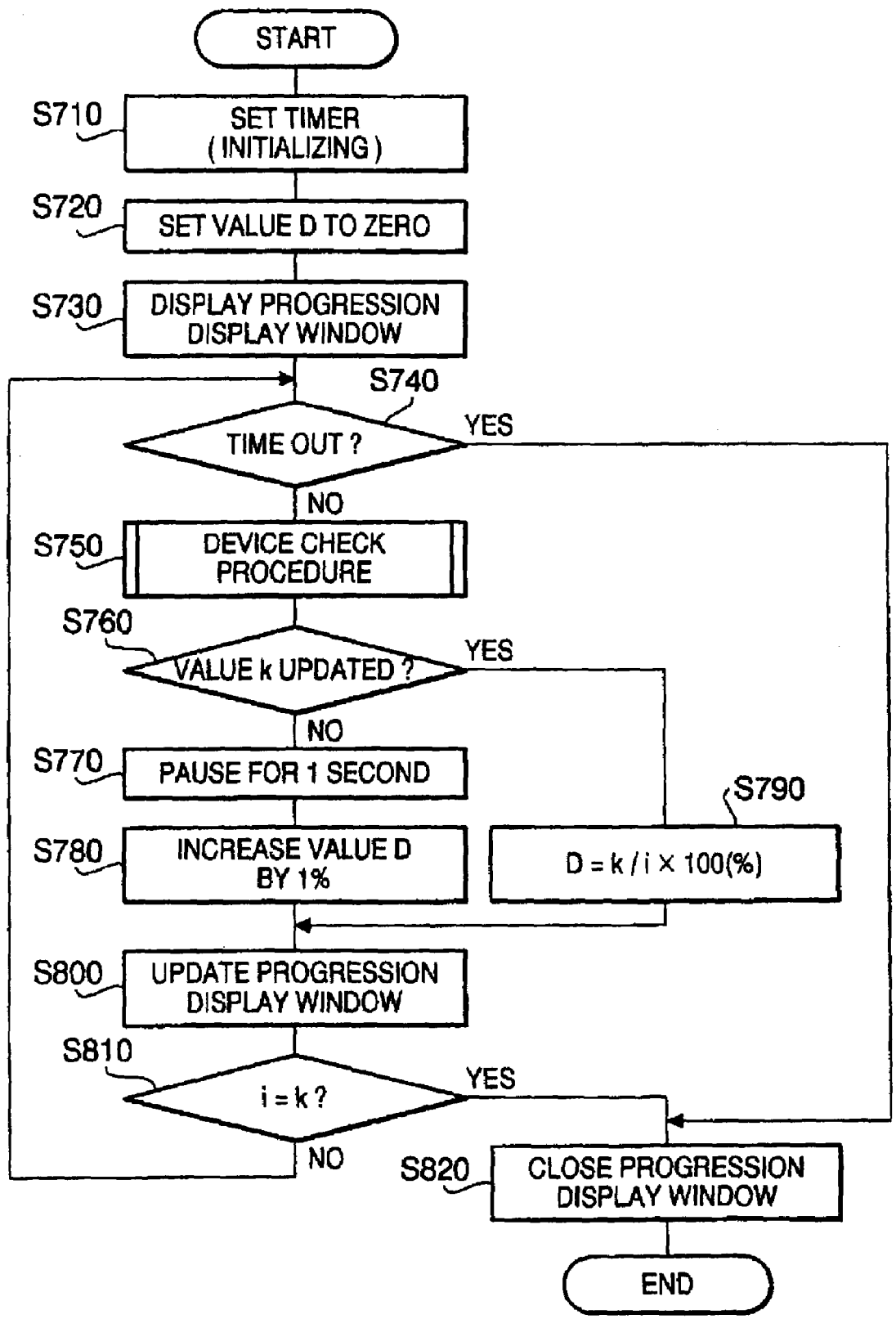
FIG. 9 is a flowchart illustrating a display control procedure executed by the set-up program.
Figure 10A:
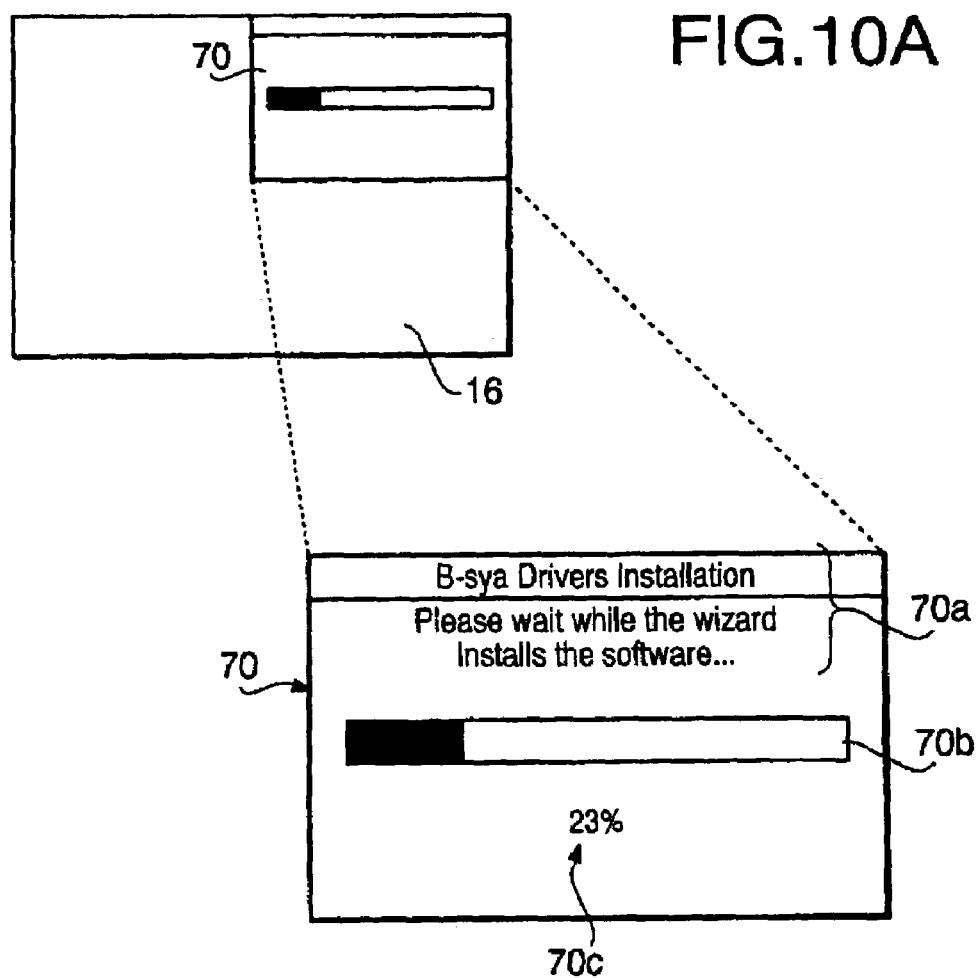
FIGS. 10A and 10B illustrate a configuration of a progress display window.
Figure 10B:
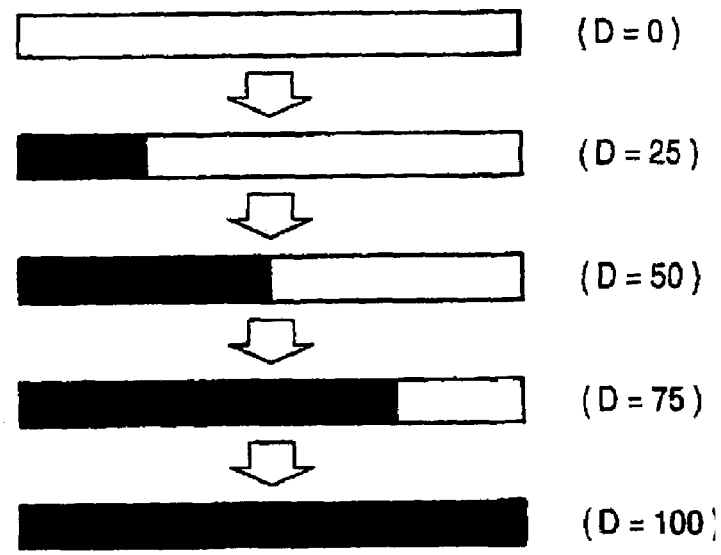

FIG. 9 is a flowchart illustrating the display control procedure executed by the set-up program 60. FIG. 10A shows a configuration of a window 70 displayed on the screen of the display unit 16 during the display control procedure, and FIG. 10B shows changes of a bar graph representing the progression of the installation displayed in the window 70.

When the display control procedure is executed, the set-up program 60 initializes a built-in timer (not shown) in S710, and sets a value D, which is used for displaying the progression of installation for all the device drivers corresponding to all the devices included in the MFD 50, to zero (S720). Then, the set-up program 60 displays the window 70 for displaying the value D on the screen of the display unit 16 (S730) as shown in FIG. 10A, and shows the value D on the window 70 graphically and numerically.

As shown in FIG. 10A, the window 70 has an area 70a for displaying a message indicating that the device drivers are being installed, a display area 70b for displaying the bar graph showing the progression of the installation, and an area 70c showing the progression of the installation as a percentage. Further, in the embodiment, a name of a manufacture (e.g., B-sya) of the device whose device driver is currently installed is indicated in the window 70 for the convenience of the user. Alternatively or optionally, a name of the device and/or detailed information regarding the installation may be indicated in the window 70.

After displaying the window 70, the set-up program 60 determines whether the timer indicates a value greater than a predetermined upper limit (i.e., time-out occurs) or not in S740. When the timer shows the value exceeding the upper limit (S740: YES), the set-up program 60 closes the window 70 (S820), and terminates the display control procedure. The upper limit is determined as a time period necessary for executing the installation normally with a predetermined latitude. Accordingly, it is assumed that the installation is not correctly performed if the timer measures the value exceeding the upper limit.

When the set-up program 60 determines, in S740, that the time-out does not occur (8740: NO), the set-up program 60 executes the device check procedure in S750. When the device check procedure is called in S750, the flag is set to "CHECK".

When the device check procedure is executed, the set-up program 60 obtains the data values of the DeviceDesc corresponding to the device handles, as aforementioned, and checks the progression of the installation executed by the plug-and-play processing module 43 by determining whether the data values of the DeviceDesc coincide with device names described in the device data file 61. As aforementioned, the set-up program 60 determines that even though the device name is not perfectly identical to the data value of the DeviceDesc, if the former is included in the latter, the set-up program 60 determines that both coincide.

Since the data regarding the devices described in the device data file 61 have been deleted from the registry 45 in the device check procedure in S290 before the installation of the device drivers by the plug-and-play processing module 43, when the data value indicating the device name is written in the parameter DeviceDesc by the plug-and-play processing module 43 after S290, the judgment in S560 is YES and the value k is incremented by one in S580.

In the device check procedure, when called in S750, the number of times determined as "YES" in S560 is the number of devices of which the installation have been finished, which number is counted using the value k. That is, when the determination in S560 is "YES", the value k is incremented by one. Thus, when the device check procedure called in S750 has been finished, the number of the devices whose device drivers have been installed is obtained as the value k.

When the set-up program 60 obtains the value k, control proceeds to S760 (FIG. 9), where the set-up program 60 determines whether the value k has been updated in the device check procedure. That is, the set-up program 60 determines whether the value k has changed before and after the execution of the device check procedure (i.e., whether the value k has been updated).

When the set-up program 60 determines that the value k has not been updated (S760: NO), the set-up program 60 pauses for one second (S770), and then increases the value D by 1% (S780) The increased value D is then displayed in the window 70 graphically and numerically. In other words, the value of the graph shown in the window 70 is increased by 1%. This means, when a device driver is being installed, the graph and the value D shown in the window 70 are gradually increased periodically until the installation is completed.

In S810, the set-up program 60 determines whether the value i is equal to the value k. When the value i is not equal to the value k, the set-up program 60 executes steps S740 and S750 and then determines, in S760, whether the value k is updated. When the set-up program 60 determines that the value k has been updated (S760: YES), the value D is calculated in accordance with the following formula.

$$D = k/i \times 100 (\%)$$

where k represents the number of the devices whose device drivers have been installed, i represents the number of devices whose device drivers are to be installed based on the device data file 61, and D represents the progression of the installation.

After calculating the value D, the set-up program 60 updates the window 70 in S800, and displays the graphic and numerical representations of the value D (i.e., the progression) in the window 70. Thus, in the window 70, a ratio of the number of devices corresponding to the device drivers installed by the plug-and-play processing module 43 with respect to the number of devices to be installed, which is obtained based on the device data file 61, is displayed as a percentage.

When the set-up program 60 determines that the value i is not equal to the value k (S810: NO), it repeats steps S740 through S810 until the value i equals to the value k (S810: YES). When the value i becomes equal to the value k (S810: YES), the window 70 displayed on the screen of the display unit 16 is closed (S820), and the display control procedure shown in FIG. 8 is terminated.

With the above control performed by the display control procedure, the progression of the installation, which is gradually updated, is displayed in the window 70 as indicated in FIG. 10B. In FIG. 10B, the bar graphs show different stages of progression of the installation. As understood from the formula indicated above, the value D changes from 0 to 100. Therefore, when the number of the built-in devices in the MFD 50 is 4 (i.e., i=4), the display area 70b of the bar graph changes such that one-quarter of-the display area 70b is filled as the device driver of the first device has been installed by the plug-and-play processing module 43.

Next, when the device driver of the second device has been installed, another one-quarter area is filled (i.e., half of the display area 70b is filled). When the device driver of the third device has been installed, three-quarters of the display area 70b are filled, and when the device driver of the final device has been installed, the entire area of the display area 70b is filled. With this control, the user can recognize the completion of the installation of the device drivers corresponding to a plurality of devices, respectively. It should be noted that, the above described progression is an exemplary case where the number of the devices is four. The invention is not limited to a case where the number of the devices is four, and an area to be filled at a time corresponds to the number of device drivers to be installed (i.e., the number of devices described in the device data file 61) may be varied.

When the display control procedure is finished, the set-up program 60 determines in S360 (see FIG. 6) that the display control procedure is finished (S360: YES). Then, the set-up program 60 determines whether the display control procedure has been finished normally in S390. It should be noted that the status when the display control procedure is finished "normally" means that the display control procedure is finished with the determination in S810 (FIG. 9) being "YES".

When the set-up program 60 determines that the display control procedure has been normally finished (S390: YES), the set-up program 60 terminates the installing procedure. When the display control procedure has not been finished normally (S390: NO), that is, when the display control procedure has been finished due to the time out (S740: YES), control proceeds to S400 where a message inquiring the user whether the installation should be executed again is displayed on the screen of the display unit 16. In S410, the set-up program 60 determines, depending on the input by the user through the input unit 17, whether a retry command is input. When the retry command has not been input (S410: NO), the installing procedure is terminated. When the retry command has been input (S410: YES), the procedure of S280 is re-executed.

Thereafter, the set-up program 60 deletes the data regarding the devices listed in the device data file 61 from the registry 45, and causes the plug-and-play processing module 43 to detect the devices, DEVICE1, DEVICE2, DEVICE3, ... and DEVICEn in the MFD 50 as new devices, and to execute the installation of the device drivers corresponding to the detected devices.

With the PC 10 according to the embodiment, the set-up program 60 displays the progress of the installation of all the device drivers executed by the plug-and-play processing module 43 based on the result of the device check procedure and the value i representing the number of the target devices. Therefore, it becomes possible to indicate the progression of the installation of the device drivers for the peripherals connected with the interface 14 for the user. Therefore, it is possible to prevent the user from being irritated due to uncertainty of the installation status of the device drivers.

Further, according to the embodiment, the set-up program 60 updates the value D representing the progression of the installation every time one of the device drivers has been installed. Therefore, the user may understand that one of the device drivers has been installed when the value D is changed.

Further to the above, when the value k, which indicates the number of the installed device drivers, does not change for a certain period of time, the set-up program 60 increases the value D by 1% at every predetermined interval. Therefore, the user may understand that the installation is in progress even when the installation of one device driver takes a relatively long time. With this configuration, the user can recognize that the installation is normally proceeding, which prevents occurrence of sense of anxiety.

Furthermore, according to the above-described embodiment, the set-up program 60 deletes the device handles of the target devices whose device drivers should be installed from the registry 45 based on the device data, and then the plug-and-play processing module 43 installs the device drivers corresponding to the target devices. Therefore, even if wrong device drivers have been installed before the set-up program 60 starts, it is unnecessary for the user to manually delete such wrong device drivers from the registry beforehand.

According to the embodiment, the set-up program 60 supplies path data indicative of a directory where the device driver can be obtained to the plug-and-play processing module 43. Therefore, without requiring the user to input such data, the plug-and-play processing module 43 can install the device driver appropriately.

Hereinafter, a modification of the above-described embodiment will be described.

Figure 12:
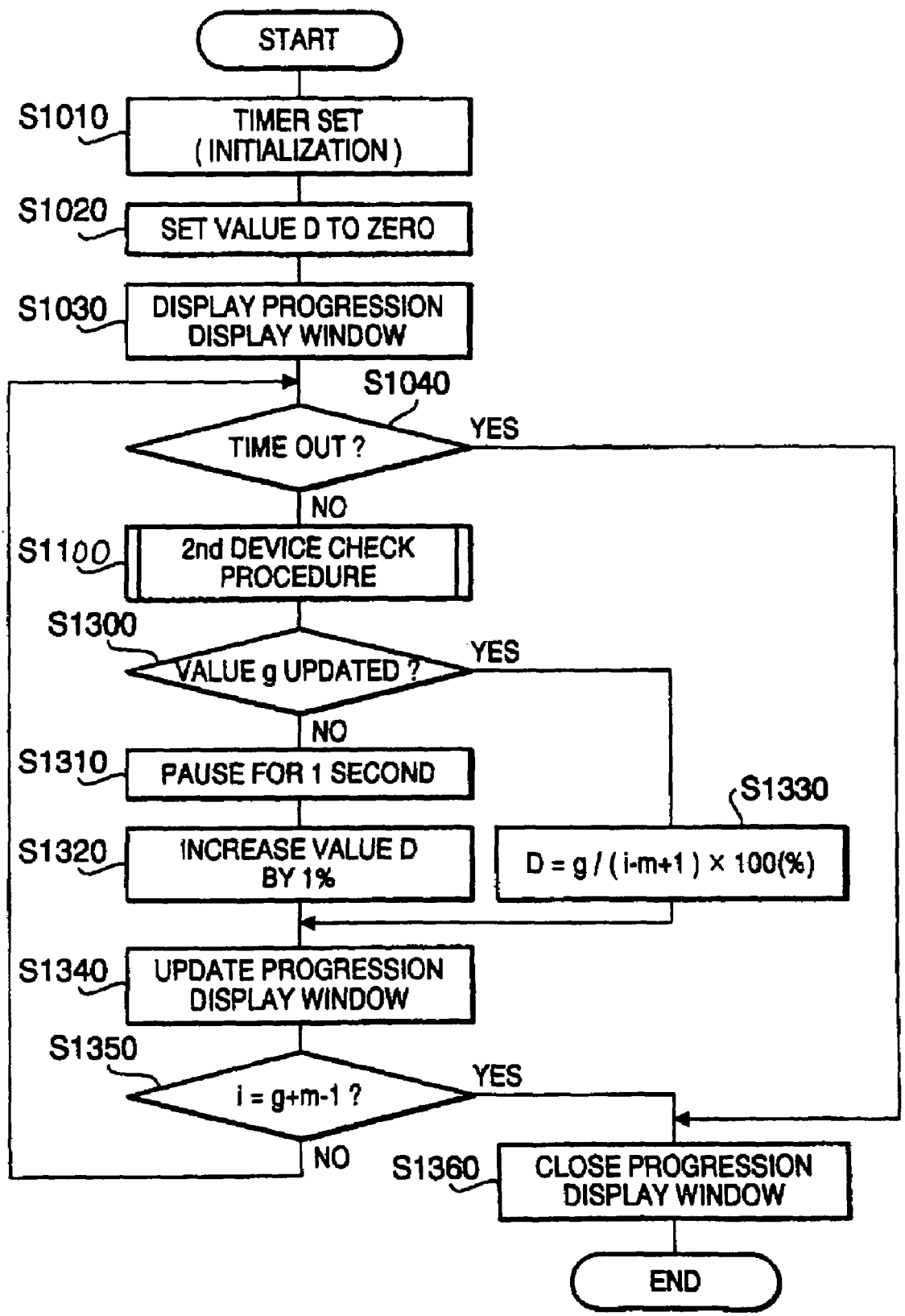
FIG. 12 shows a flowchart illustrating a display control procedure according to a modification of the embodiment.

FIG. 11 shows a data structure of a device data file 61' according to the modification of the embodiment. FIG. 12 shows a flowchart illustrating a display control procedure according to the modification of the embodiment.

In the following description, only portions of the modification different from the above-described embodiment will be described.

As shown in FIG. 11, the device data file 61' includes device data regarding six devices (DEVICE 1, DEVICE 2, ... DEVICE 6) which are included in a MFD 50, and whose device drivers should be installed. Specifically, the device data file 61' includes, as target device data, device names, hardware IDs and data values representing a class of each device. In this modification, there are four predetermined classes, "scanner", "printer", "multifunction" and "modem". As indicated in FIG. 11, one device belongs to each of the "scanner", "printer" and "multiscan" classes, while three devices belong to the "modem" class.

According to the modification, the set-up program 60 executes the display control procedure shown in FIG. 12 at S350 (FIG. 6) instead of that shown in FIG. 9.

In S1010, the set-up program 60 initializes the timer, and sets the value D to zero (D=0) in S1020. In S1030, the set-up program 60 displays the window 70 for displaying the value D (see FIG. 10A) on the screen of the display unit 16.

In S1040, the set-up program 60 determines whether the timer is time out. When the timer is time out, in S1360, the window 70 displayed on the screen of the display unit 16 is closed, and the display control procedure is terminated.

When the set-up program 60 determines that the timer is not-time out (S1040: NO), control proceeds to S1100, where a second device check procedure shown in FIG. 13 is called.

Figure 13:
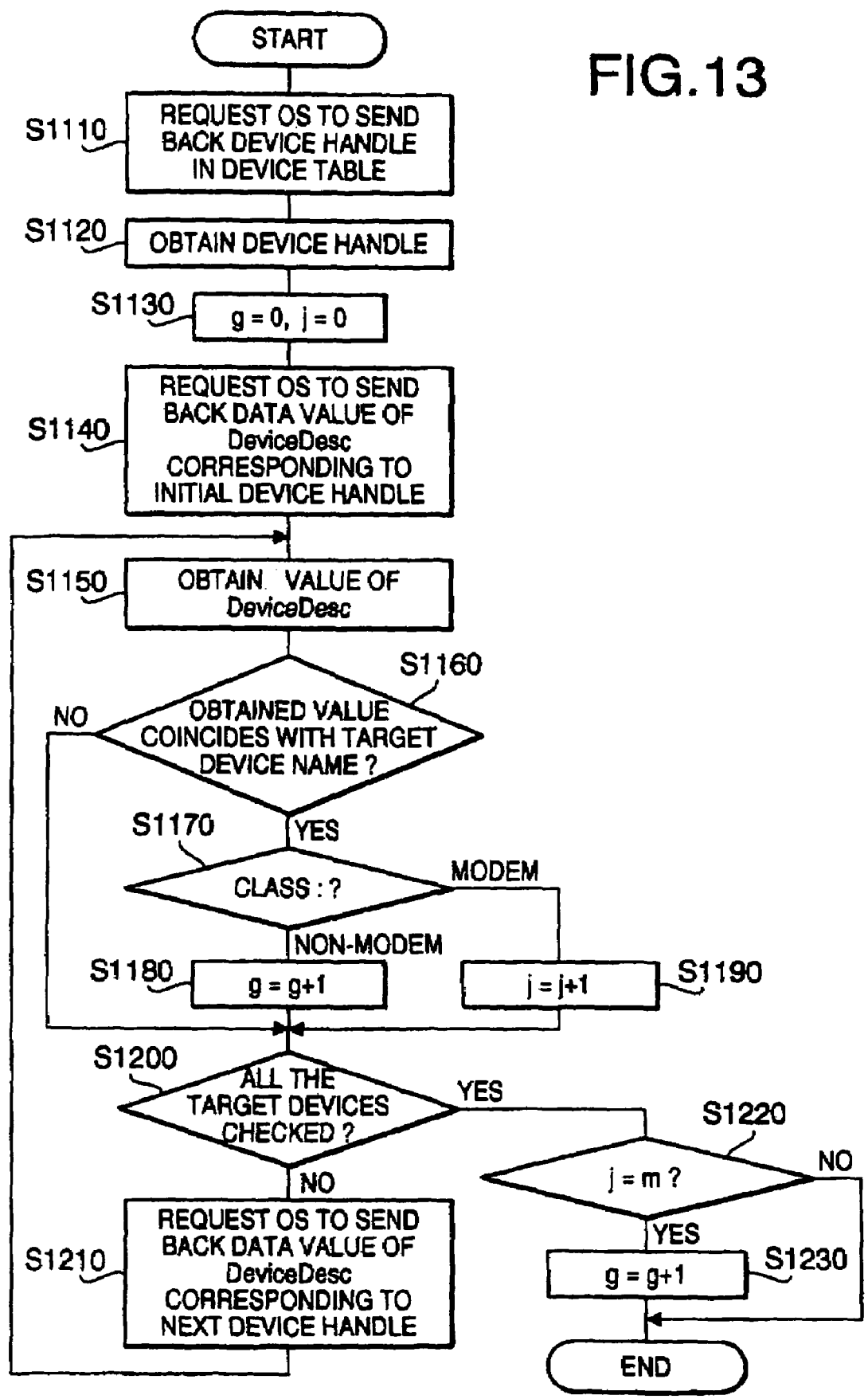
FIG. 13 is a flowchart illustrating a second device check procedure executed by the set-up program.

FIG. 13 is a flowchart illustrating the second device check procedure executed by the set-up program 60 in S1100.

In S1110, the set-up program 60 requests the OS 42 to return the device handles in the device table 46. Then, the OS 42 sends all the device handles listed in the device table 46 to the set-up program 60, and accordingly, the set-up program 60 obtains all the device handles returned from the OS 42 in S1120.

In S1130, the set-up program 60 initializes a value g (g=0) which represents the number of the classes corresponding to the device drivers having been installed, and a value j (j=0) which represents the number of devices belonging to the "modem" class among the devices whose device drivers have been installed.

In S1140, the set-up program 60 requests the OS 42 to return a data value of the parameter DeviceDesc corresponding to the first device handle, and obtains the data value of the parameter DeviceDesc from the OS 42 (S1150).

Next, the set-up program 60 determines whether the data value of the parameter DeviceDesc thus obtained coincides with one of the device names listed in the device data file 61' (S1160).

When data representing the device name is written in the parameter DeviceDesc by the plug-and-play processing module 43, the determination in S1160 of the set-up program 60 is "YES", and control proceeds to S1170. In S1170, the set-up program 60 determines the class to which the device corresponding to the device driver installed by the plug-and-play processing module 43 belongs. When the set-up program 60 determines that the device does not belong to the "modem" class (S1170: NON-MODEM), it assumes that the installation of all the device drivers for the devices belonging to the class have been finished, and increases the value g by one (S1180). When the device belongs to the "modem" class (S1170: MODEM), the set-up program 60 increases the value j by one in S1190.

Next, in S1200, the set-up program 60 determines whether the checking operation described above has been done for all the devices. When the checking operation has not been completed (S1200: NO), the set-up program 60 requests the OS 42 to return the data value of the DeviceDesc corresponding to the next device handle (S1210).

When the checking operation has been finished (S1200: YES), in S1220, the set-up program 60 determines whether the value j is equal to the value m representing the number of the devices belonging to the "modem" class. In this modification of the embodiment, the value m is three (see FIG. 11). The value m is set in S230 together with the value i based on the device data file 61'.

When it is determined that the value j is not equal to the value m (S1220: NO), the set-up program 60 terminates the second device check procedure. When it is determined that the value j is equal to the value m (S1220: YES), the set-up program 60 assumes that all the device drivers corresponding to the devices belonging to the "modem" class have been installed. In such a case, the set-up program 60 increases the value g by one in S1230, and then terminates the second device check procedure.

As described above, in the second device check procedure, when all the device drivers corresponding to the devices belonging to one class have been installed, the value g is incremented by one in S1180 and S1230. Thus, the set-up program 60 obtains, when the second device check procedure is finished (S1100), the value g representing the number of classes corresponding to the device drivers which have been installed.

When the value g is obtained, the set-up program 60 determines whether the value g has been updated before and after the execution of the second device check procedure in S1300 (FIG. 12).

When the value g is not updated (S1300: NO), the set-up program 60 pauses for one second (S1310), and then increases the value D by 1% (S1320). The increased value D is then displayed in the window 70 graphically and numerically. In other words, the value of the graph shown in the window 70 is increased by 1% in S1340.

In S1350, the set-up program 60 determines whether the value i is equal to the value (g+m−1). When the value i is not equal to the value (g+m−1), the set-up program 60 executes steps S1040 and S1100 and then determines, in S1300, whether the value g has been updated. When the set-up program 60 determines that the value g has been updated, the value D is calculated in accordance with the following formula.

$$D = g/(i-m+1) \times 100(\%)$$

where the value D represents the progression of the installation.

After calculating the value D, the set-up program 60 updates the window 70 in S1340, and displays the graphic and numerical representations of the value D (i.e., the progression) in the window 70. Thus, in the window 70, a ratio of the number of classes corresponding to the device drivers having been installed by the plug-and-play processing module 43 with respect to the number of classes to be installed (i−m+1) is displayed.

When the set-up program 60 determines that the value i is equal to the value (g+m−1) (S1350: YES), the window 70 displayed on the screen of the display unit 16 is closed (S1360), and the display control procedure shown in FIG. 12 is terminated.

With the above control performed by the set-up program 60, the progression of the installation, which is updated to 25%, 50%, 75% and 100% upon completion of the installation of device drivers corresponding to the "scanner", "printer", "multifunction" and "modem" classes, respectively, is sequentially displayed in the window 70.

With the PC 10 according to the modification of the embodiment, the set-up program 60 determines that to which class each of the devices corresponding to the device drivers having been installed by the plug-and-play processing module 43 belongs in S1170. The set-up program 60 further determines whether all the device drivers of the devices belonging to each class have been installed and obtains the values g and j representing the determination results. Then, based on the values g and j, the set-up program 60 displays a ratio of the number of the classes corresponding to the device drivers installed up to the current time with respect to the predetermined number of classes. Accordingly, the number of classes for which all the device drivers have been installed is indicated with respect to the number of all the classes. With such a configuration, the progress of the installation of all the device drivers for each class can be indicated as well as the progress of the installation with respect to the entire process.

It should be noted that the present invention is not limited to the configurations described above with reference to the embodiment and its modification, but various modification can be made without departing from the scope of the invention.

For example, although the path data indicative of the location where the device driver is obtained is described in the set-up program 60 and the set-up program 60 is designed specifically for the MFD 50 in the above-described embodiment, the path data may be indicated in the device data file 61 or 61', and the set-up program 60 may read the path data from the device data file 61 (or 61') and transmit the path data to the plug-and-play processing module 43. With such a configuration, the set-up program 60 is not limited to that for the MFD 50, but can be configured as a set-up program for various devices.

If the INF file data relating to an INF file for each device is stored in the device data file, the device data file 61 may be replaced with a device data file 62 shown in FIG. 14.

The device data file 62 includes, as device data of the target devices to be installed, a common device name which is a common name for all the devices included in the MFD 50, and a corresponding hardware ID, and INF file data (i.e., names of the INF files) respectively corresponding to the devices.

When the device data file 62 described above is used, in the procedure shown in FIG. 5, the set-up program 60 may be configured so as to obtain the common device name and the hardware ID in S220, and set the value i representing the number of the target devices in S230 in accordance with the number of the INF files stored in the device data file 62.

In the example in FIG. 14, since there are four target devices, four pieces of INF file data (i.e., four names) are included in the device data file 62. In such a configuration, it may be convenient if the INF files are stored as well as the device data file 62 in the CD 20. In this case, the INF files may be stored in the same directory where the device data file 62 is stored, or may be stored in a different directory.

It should be noted that the value i representing the number of the target devices may be different from the number of the INF files described in the device data file 62. In such a case, the set-up program 60 may be provided with a formula for calculating the value i from the number of the INF files. Alternatively or optionally, the number of the target devices may be included in the device data file 62.

The present disclosure relates to the subject matter contained in Japanese Patent Application No. 2002-160145, filed on May 30, 2002, which is expressly incorporated herein by reference in its entirety.

What is claimed is:

1. A method of displaying a progression of installation for a data processing apparatus having an interface to which a peripheral composed of a plurality of devices is connected, the data processing apparatus operating on an operating system provided with a first device data storage, an installer that installs device drivers corresponding to the plurality of devices by detecting the plurality of devices implemented in the peripheral, obtaining device drivers corresponding to the plurality of devices and storing device data regarding the plurality of devices in the first device data storage, and a second device data storage that stores, in advance, target device data regarding all target devices which correspond to the device drivers to be installed in the operating system by the installer, the method comprising the steps of:
monitoring a progression of installation of device drivers executed by the installer;
recognizing a total number of target devices of which device drivers are to be installed by the installer in accordance with the target device data stored in the second device data storage; and
displaying simultaneously the progression of the installation of all the device drivers based on a result of the monitoring step and with the total number of the target devices recognized in the recognizing step.

2. The method according to claim 1, wherein the step of displaying displays the progression as a ratio of the number of devices corresponding to the device drivers having been installed by the installer to the total number of the target devices recognized by the number recognition system at a completion of the installation of each of the device drivers for the target devices.

3. The method according to claim 1, wherein the step of displaying displays the progression of installation with a bar graph.

4. The method according to claim 3, wherein a value of the bar graph indicative of the progression of installation is increased at every predetermined interval when the installation is in progress.

5. A data processing apparatus operating on an operating system, the data processing apparatus having an interface to which a peripheral composed of a plurality of devices is connected, the data processing apparatus comprising:
a first device data storage;
an installer that installs device drivers corresponding to the plurality of devices by detecting the plurality of devices implemented in the peripheral, obtaining device drivers corresponding to the plurality of devices, and storing device data regarding the plurality of devices in the first device data storage;
a second device data storage that stores, in advance, target device data regarding all target devices which correspond to the device drivers to be installed in the operating system by the installer;
a number recognition system that recognizes a total number of the target devices corresponding to the device drivers to be installed in the operating system in accordance with the target device data stored in the second device data storage;
a monitoring system that monitors a progression of installation executed by the installer; and
a progression indication system that simultaneously indicates the progression of the installation of all the device drivers executed by the installer, in accordance with a monitoring result by the monitoring system and with the total number of the target devices recognized by the number recognition system.

6. The data processing apparatus according to claim 5, wherein the progression indication system includes a display, the progression of the installation being displayed on the display.

7. The data processing apparatus according to claim 6, wherein the progression indication system displays the progression of the installation on the display using a single bar graph.

8. The data processing apparatus according to claim 7, wherein a value of the bar graph indicative of the progression of the installation is increased at every predetermined interval when the installation is in progress.

9. The data processing apparatus according to claim 5, wherein the progression indication system indicates the progression as a ratio of the number of devices corresponding to the device drivers having been installed by the installer to the total number of the target devices recognized by the number recognition system at a completion of the installation of each of the device drivers.

10. The data processing apparatus according to claim 5,
    wherein the progression indication system includes a determining system that identifies a class, from among a plurality of predetermined classes, to which each of the devices corresponding to the device drivers installed by the installer belongs in accordance with the monitoring result by the monitoring system and the recognition result of the number recognition system, the determining system determining whether all the device drivers belonging to each class have been installed; and
    wherein the progression indication system indicates the number of classes each having only the devices corresponding to device drivers having been installed by the installer as a ratio with respect to the number of the predetermined classes, in accordance with the determination result of the determining system.

11. The data processing apparatus according to claim 5, wherein the monitoring system monitors the progression of the installation of the device drivers by the installer by referring to the device data stored in the first device data storage.

12. The data processing apparatus according to claim 11,
    wherein the installer obtains a device driver corresponding to each of the detected devices and stores driver data of each device driver in relation to identification data of the device in the first device data storage, and
    wherein the monitoring system determines whether the installation of the device drivers corresponding to the target devices is finished by monitoring a registration status of the device data in the first device data storage.

13. The data processing apparatus according to claim 12,
    wherein the installer is configured to detect a new device by determining whether the identification data of each device included in the peripheral connected to the interface is stored in the first device data storage, and to install a device driver corresponding to the new device, and
    wherein the data processing apparatus includes an initializing system that determines whether all the device data for the target devices is stored in the first device data storage based on the target device data stored in the second storage, and deletes all the identification data of the target devices from the first device data storage when the initializing system determines that all the driver data is not stored in the first data storage.

14. The data processing apparatus according to claim 5, further comprising an assist system that assists the installer in obtaining data necessary for installing the device drivers.

15. The data processing apparatus according to claim 14, wherein the assist system supplies the installer with location data indicating a location where the device drivers necessary for the installation can be obtained.

16. The data processing apparatus according to claim 5, wherein the target device data on the second device data storage is obtained from a compact disk.

17. A computer-readable recording medium storing a program defining a method to be executed by a data processing apparatus having an interface to which a peripheral composed of a plurality of devices can be connected, the data processing apparatus operating on an operating system provided with a first device data storage, an installer that installs device drivers corresponding to the plurality of devices by detecting the plurality of devices implemented in the peripheral, obtaining device drivers corresponding to the plurality of devices and storing device data regarding the plurality of devices in the first device data storage, and a second device data storage that stores, in advance, target device data regarding all target devices which correspond to the device drivers to be installed in the operating system by the installer,
    the method comprising the steps of:
    monitoring a progression of installation of device drivers executed by the installer;
    recognizing a total number of target devices of which device drivers are to be installed by the installer in accordance with the target device data stored in the second device data storage; and
    displaying simultaneously the progression of the installation of all the device drivers based on a result of the monitoring step and with the total number of the target devices recognized in the recognizing step.

18. The medium according to claim 17, wherein the step of displaying displays the progression as a ratio of the number of devices corresponding to the device drivers having been installed by the installer to the total number of the target devices recognized by the number recognition system at a completion of the installation of each of the device drivers for the target devices.

19. The medium according to claim 17, wherein the step of displaying displays the progression of installation with a bar graph.

20. The medium according to claim 19, wherein a value of the bar graph indicative of the progression of installation is increased at every predetermined interval when the installation is in progress.

21. A device driver install system, embodied in a computer-readable recording medium, for a data processing apparatus having an interface to which a peripheral composed of a plurality of devices is connected, the driver install system comprising:
    an operating system on which the data processing apparatus operates, the operating system detecting the plurality of devices included in the peripheral and installing therein device drivers respectively corresponding to the plurality of devices by obtaining the device drivers and storing device data regarding the plurality of devices in a first device data storage of the data processing apparatus; and
    an external process that receives, from the operating system, a number of the plurality of devices, a number of device drivers having been installed in the operating system, and a total number of target devices obtained in accordance with target device data stored in a second device data storage of the data processing apparatus and corresponding to the device drivers to be installed in the operating system, the external process simultaneously indicating a progression of the installation of all the device drivers in accordance with the number of the plurality of devices, the number of device drivers having been installed in the operating system, and with the total number of the target devices.

22. The device driver install system according to claim 21, further including a display device, the external process indicating the progression of the installation by displaying at least one of a single bar graph and a numerical value on the display device.

23. The device driver install system according to claim 22, wherein a value of the bar graph indicative of the progression of the installation is increased at every predetermined interval when the installation is in progress.

24. The device driver install system according to claim 21, wherein the external process indicates a completion of the installation of each of the device drivers.

25. The device driver install system according to claim 21, wherein the device drivers are categorized in a plurality of classes each including at least one device driver, the external process indicating the completion of the installation of all the device drivers included in each of the plurality of classes.

26. The device driver install system according to claim 21, wherein the external process indicates that the installation of each of the device drivers is in progress when each of the device drivers is being installed.

27. The device driver install system according to claim 21, wherein the external process assists the operating system in installing the plurality of device drivers.

28. The device driver install system according to claim 27, wherein the external process provides path data of each of the plurality of device drivers.

29. The device driver install system according to claim 21, wherein the external process is supplied as a program to be executed by the data processing apparatus.

30. The device driver install system according to claim 29, wherein the program is recorded on a recording medium that can be accessed by the data processing apparatus.

* * * * *